United States Patent
Tago et al.

(10) Patent No.: US 10,752,204 B2
(45) Date of Patent: Aug. 25, 2020

(54) VEHICLE SEAT

(71) Applicant: TACHI-S CO., LTD., Tokyo (JP)

(72) Inventors: Tomoki Tago, Tokyo (JP); Yohei Ota, Tokyo (JP)

(73) Assignee: Tachi-S Co., Ltd., Tokyo (JP)

(*) Notice: Subject to any disclaimer, the term of this patent is extended or adjusted under 35 U.S.C. 154(b) by 38 days.

(21) Appl. No.: 16/011,944

(22) Filed: Jun. 19, 2018

(65) Prior Publication Data

US 2018/0370482 A1    Dec. 27, 2018

(30) Foreign Application Priority Data

Jun. 26, 2017   (JP) .................................. 2017-123876

(51) Int. Cl.
  *B60R 22/26*   (2006.01)
  *B60N 2/64*   (2006.01)
  *B60R 22/18*   (2006.01)
  *B60N 2/68*   (2006.01)

(52) U.S. Cl.
  CPC ................ *B60R 22/26* (2013.01); *B60N 2/64* (2013.01); *B60N 2/688* (2013.01); *B60R 22/18* (2013.01); *B60R 2022/1818* (2013.01)

(58) Field of Classification Search
  CPC ... B60R 22/26; B60R 2022/1818; B60N 2/64; B60N 2/688
  See application file for complete search history.

(56) References Cited

U.S. PATENT DOCUMENTS

| 5,609,396 A | * | 3/1997 | Loxton | B60N 2/688 297/464 |
| 5,716,073 A | * | 2/1998 | Redman | B60R 22/26 280/801.1 |
| 5,826,946 A | * | 10/1998 | Matthews | B60N 2/5816 297/452.57 |
| 7,635,167 B2 | * | 12/2009 | Okazaki | B60N 2/688 280/808 |
| 8,820,790 B2 | * | 9/2014 | Wenz | B60N 2/58 280/801.1 |
| 2008/0054703 A1 | | 3/2008 | Okazaki | |

FOREIGN PATENT DOCUMENTS

| JP | 2006-027416 A | 2/2006 |
| JP | 2008-056229 A | 3/2008 |
| JP | 2009-262724 A | 11/2009 |

* cited by examiner

*Primary Examiner* — Philip F Gabler
(74) *Attorney, Agent, or Firm* — Morgan, Lewis & Bockius LLP

(57) ABSTRACT

A vehicle seat 1 includes: a backrest frame 40 provided in the backrest 11, an opening member 30 having an opening 31 that allows a seat belt 13 extending from the inside of the backrest 11 to pass through toward the front side; and a cover holding plate 130 that holds a cover 51 covering a surface of the backrest 11. Second holes 110 of the opening member 30, third holes 142 of the cover holding plate 130 and first holes 90 of the backrest frame 40 are arranged, in the order mentioned, toward the rear side of the backrest 11, so as to coincide with each other. The opening member 30 and the cover holding plate 130 are fixed to the backrest frame 40 by screws 150 inserted in the holes 110, 142 and 90.

5 Claims, 8 Drawing Sheets

VEHICLE SEAT

CROSS-REFERENCES TO RELATED APPLICATIONS

This application relates to and claims priority from Japanese Patent Application No. 2017-123876, filed on Jun. 26, 2017, the entire disclosure of which is incorporated herein by reference.

BACKGROUND

Field

The present invention relates to a vehicle seat having a seat part, a backrest and a seat belt.

Description of Related Art

Some vehicle seats have a seat belt retractor which is embedded in a backrest or a seat part and a seat belt which is extended to the outside of the backrest from an upper part of the backrest (see JP2008-056229 A and JP2006-027416 A).

A vehicle seat of this type may include a cover member in an upper surface of the backrest, the cover member having an opening which allows the seat belt to pass therethrough (see JP2009-262724 A).

However, since the above-mentioned cover member is provided on a cover that covers a surface of a pad of the backrest, if part of the cover which is located around the cover member is pressed by, for example, a user, the cover is dented, which creates a gap between the cover and the cover member. If such gap is created between the cover and the cover member, a finger may be caught by such gap and the design (appearance) of such seat may become unfavorable.

The vehicle seat described in JP2009-262724 A includes a cover support member below the cover member in order to suppress the gap to be created between the cover and the cover member. However, in such case, the structure in the vicinity of an upper part of the backrest becomes complicated and the workability during assembly of the cover and the cover member becomes deteriorated.

SUMMARY

The present invention has been made in view of the above circumstances and one of the objects of the present invention is to provide a vehicle seat which suppresses a gap to be created between a cover and an opening member having an opening that allows a seat belt to pass therethrough, and has a simple structure which achieves good workability during assembly.

An aspect of the present invention provides a vehicle seat having a seat part, a backrest and a seat belt, the vehicle seat comprising: a backrest frame provided in the backrest; an opening member provided on an upper part of the backrest, the opening member having an opening that allows the seat belt extending from an inside of the backrest to pass through toward a front side; and a cover holding member that holds a cover covering a surface of the backrest, wherein the opening member, the cover holding member and the backrest frame have respective holes, wherein the hole of the opening member, the hole of the cover holding member and the hole of the backrest frame are arranged in an order mentioned toward a rear side of the backrest, so as to coincide with each other, and the opening member and the cover holding member are fixed to the backrest frame by a fastening member inserted in the holes.

According to such aspect, since the cover holding member holds the cover and such cover holding member is provided between the opening member and the backrest frame and fixed to the backrest frame, a sufficient tension can be applied to the cover around the opening member. As a result, it becomes possible to suppress a gap to be created between the opening member and the cover. Further, since the opening member and the cover holding member are fixed to the backrest frame by the fastening member inserted in the hole of the opening member, the hole of the cover holding member and the hole of the backrest frame, it is possible to achieve a simple structure of the vehicle seat and improve the workability during the assembly of the vehicle seat.

The backrest frame may have a bracket provided with the hole of the backrest frame; and the cover holding member may be detachably attached to the bracket.

The cover holding member may be detachably attached to the bracket by hooking onto the bracket from above.

The cover holding member may be detachably attached to the bracket such that the cover holding member is positioned in a right and left direction relative to the bracket and, when the cover holding member is attached to the bracket, a position of the hole of the cover holding member and a position of the hole of the backrest frame may coincide with each other.

An end of the cover may be sewed with the cover holding member

The cover holding member may have a higher stiffness than the cover.

The hole of the opening member, the hole of the cover holding member and the hole of the backrest frame may be provided below the opening.

Advantageous Effect of the Invention

According to the present invention, it is possible to provide a vehicle seat which suppresses a gap to be created between a cover and an opening member having an opening that allows a seat belt to pass therethrough and has a simple structure which achieves good workability during assembly.

DETAILED DESCRIPTION

Figure 1:
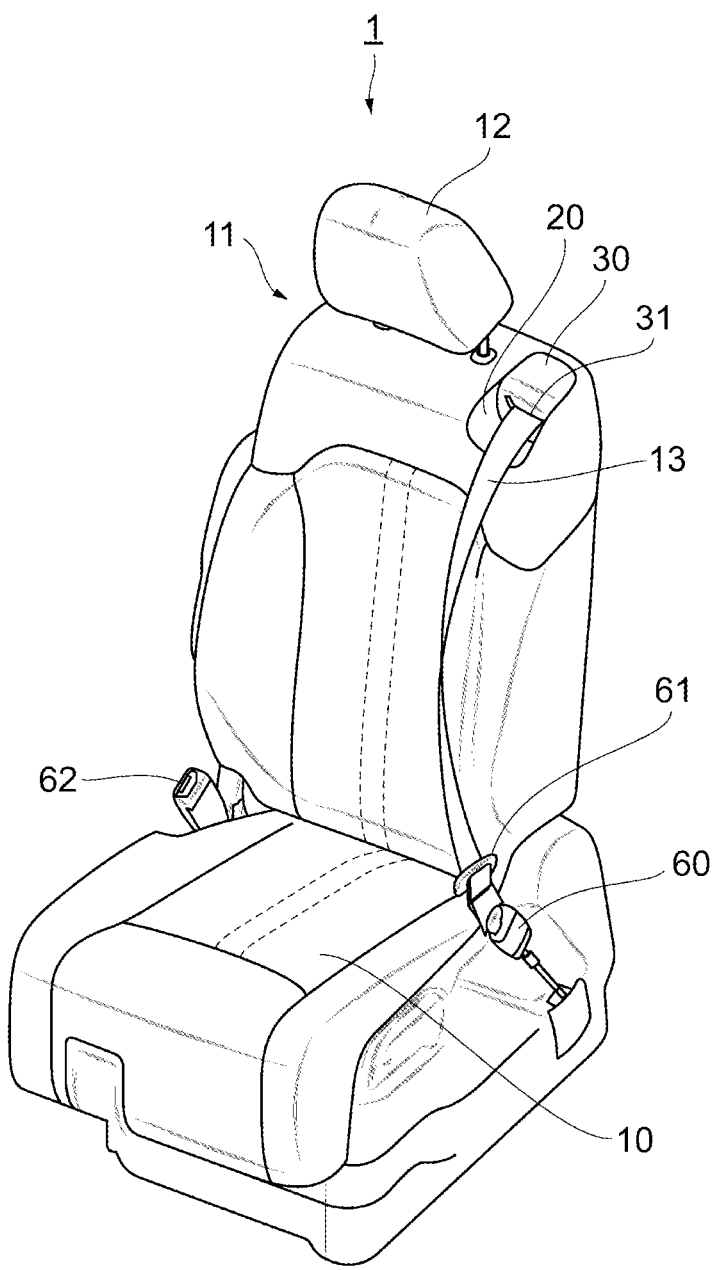
FIG. 1 is a perspective view showing an example of a configuration of a vehicle seat.

A preferred embodiment of the present invention will now be described below with reference to the attached drawings.

Like reference numerals denote similar components and redundant explanations thereof will be omitted. The positional relationships such as upper, lower, right and left are based on the positional relationships shown in the drawings, unless otherwise indicated. The dimensional ratios in the drawings are not limited to those shown in the drawings. The following embodiment is an example for explaining the present invention and the present invention is not limited to such embodiment.

FIG. 1 shows an example of a configuration of a vehicle seat 1. For example, the vehicle seat 1 may include a seat part 10 on which a sitter sits, a backrest 11 against which the sitter leans on his/her back, a headrest 12, a seat belt 13, etc.

Figure 2:
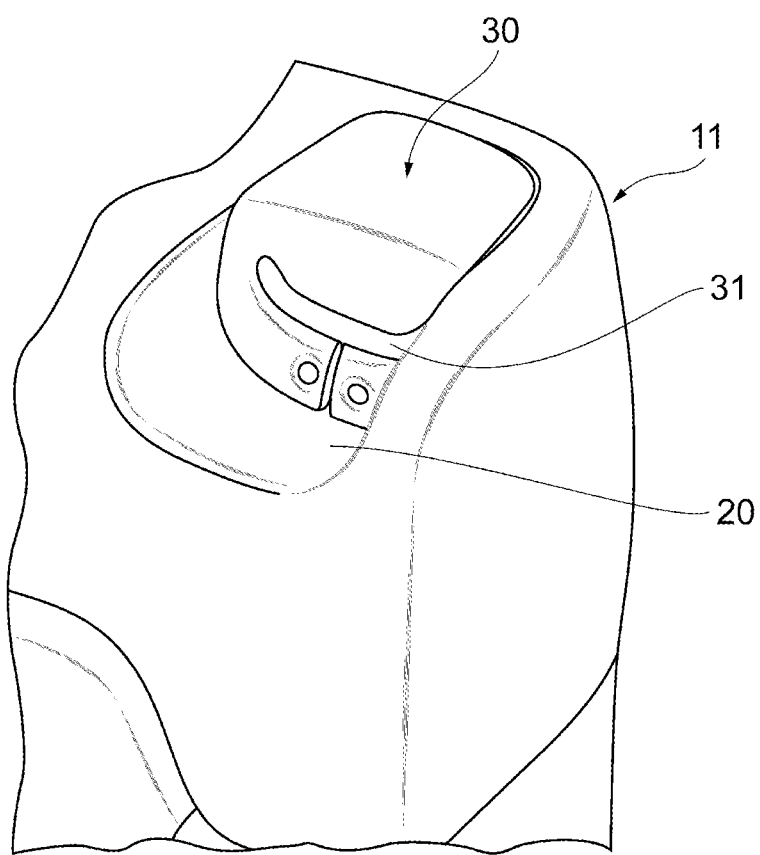
FIG. 2 is an enlarged view showing a shoulder part of a backrest in an enlarged manner.

The backrest 11 has a groove 20 in an upper surface thereof (an upper surface of a shoulder part of the backrest 11) which is located on the right or left side of the headrest 12. As shown in FIG. 2, the groove 20 is formed so as to extend from a front surface of the backrest 11 toward a rear side. The groove 20 is formed in a substantially semi-cylindrical shape. An opening member 30 is provided on the rear side in the groove 20. Specifically, the opening member 30 is provided at a position on the rear side with respect to the front surface of the backrest 11. The opening member 30 has an opening 31 on its front surface so that the seat belt 13 extending from the inside of the backrest 11 passes through the opening 31 toward the front side. The opening member 30 is embedded in the backrest 11 below the upper surface of the backrest 11. For example, the opening member 30 is accommodated within a parallelepiped outer contour of the backrest 11 such that the upper surface of the opening member 30 is substantially flush with the upper surface of the backrest 11.

Figure 3:
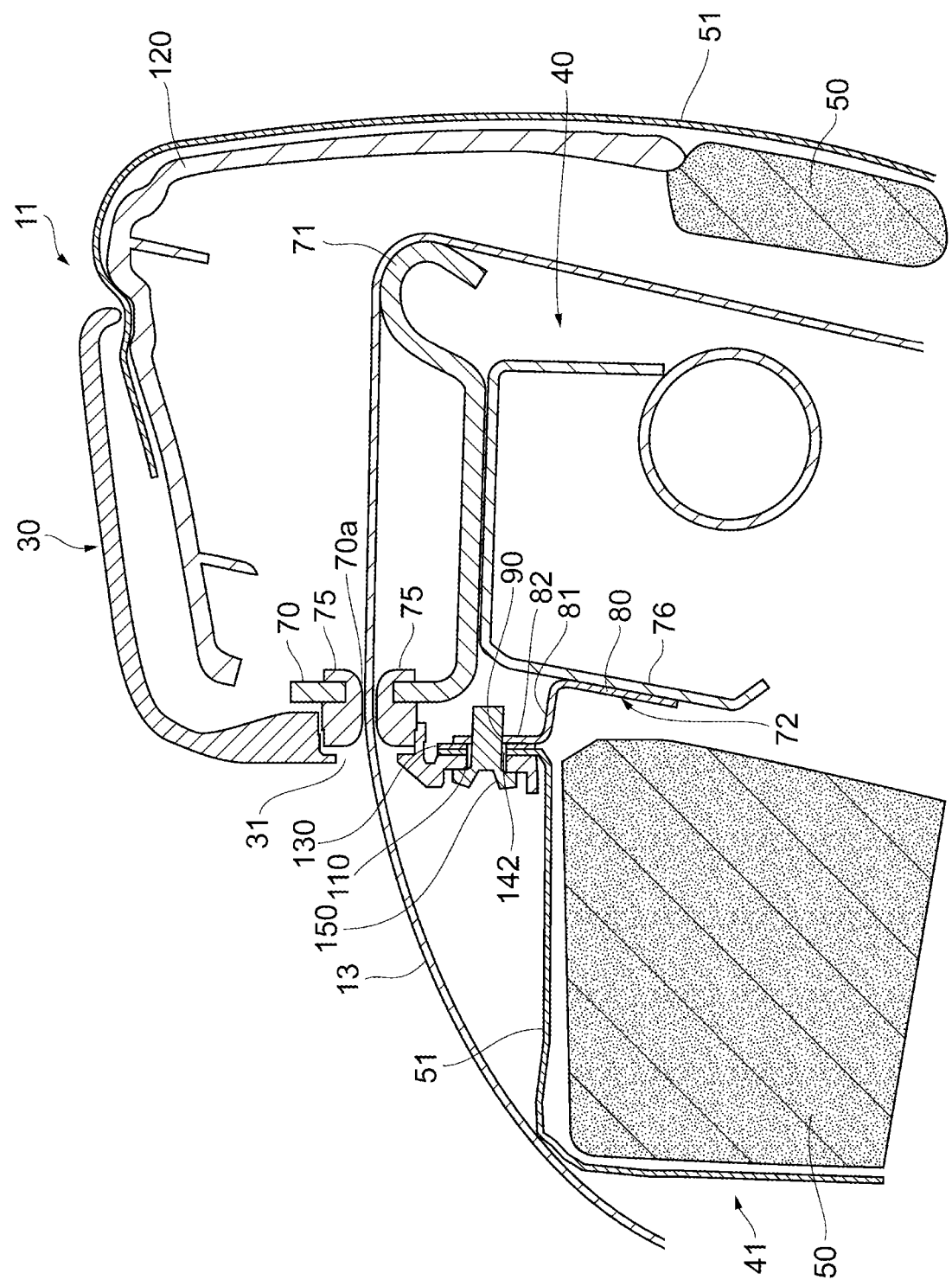
FIG. 3 is a cross-sectional view showing an example of an internal configuration of the backrest.

As shown in FIG. 3, the backrest 11 includes a backrest frame 40 constituting a framework structure of the backrest 11, and a seat cover 41 arranged around the backrest frame 40. The seat cover 41 includes a thick cushion part (pad part) 50 and a cover 51 covering the surface of the backrest 11. The cushion part 50 may be made of, for example, a material such as urethane. The cover 51 may be made of a stretchable and elastic material such as chemical fiber, artificial leather or genuine leather. The backrest 11 has a reclining function capable of being lowered rearward and raised forward.

The seat belt 13 is extended upward from a retractor (not shown) provided at a lower part inside the backrest 11, folded forward at an upper part inside the backrest 11 and extended out from the opening 31 of the opening member 30. The seat belt 13 extended out from the opening 31 is fitted and fixed in a pretensioner 60 arranged on a lateral side of the seat part 10 as shown in FIG. 1. The seat belt 13 is provided with a tongue plate 61 and the engagement of such tongue plate 61 with a buckle 62 of the seat part 10 allows the sitter to fasten the seat belt 13.

As shown in FIG. 3, the backrest frame 40 may be made of, for example, a resin or a metal, and includes an opening frame 70, a belt guide 71, a bracket 72 to which the opening member 30 is fixed, etc.

Figure 4:
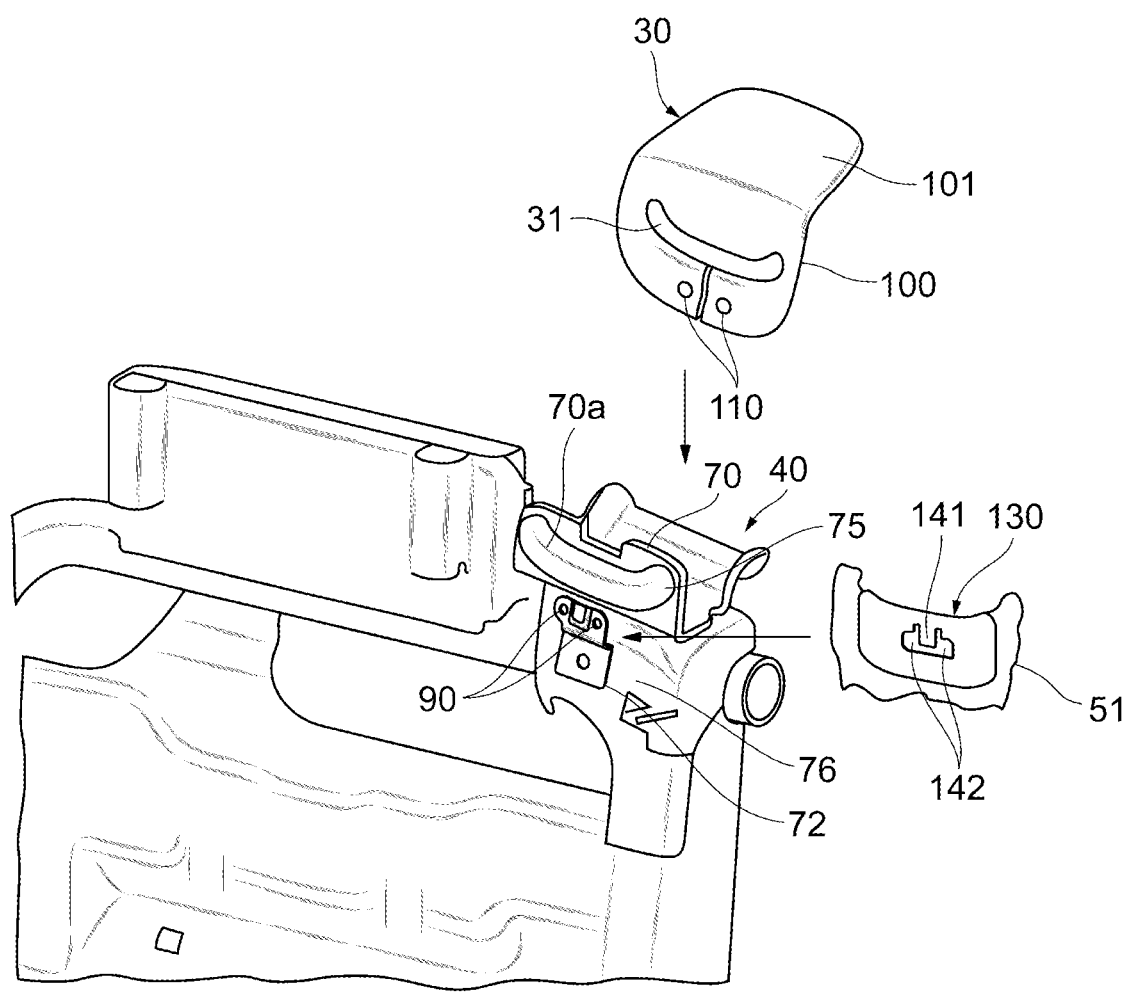
FIG. 4 is an illustration showing a configuration of a backrest frame.

The opening frame 70 forms an opening 70a through which the seat belt 13 passes. As shown in FIG. 4, the opening 70a extends in a right and left direction in an elongated manner with each end thereof being raised upward. As shown in FIG. 3, the opening 70a is provided with a resin-made protection member 75 that protects the seat belt 13.

The belt guide 71 is curved in an arc-like shape such that it can change the direction of the seat belt 13 extended from the lower side toward the front side.

As shown in FIGS. 3 and 4, the backrest frame 40 has a front plate 76 provided in a standing manner on the front surface side and the bracket 72 is fixed onto the front plate 76. The bracket 72 may be fixed onto the front plate 76 with a fastening member such as a screw or may be integrally molded with the front plate 76. The bracket 72 may be made of the same material as the material of the other part of the backrest frame body including the front plate 76 or may be made of a different material.

Figure 5:
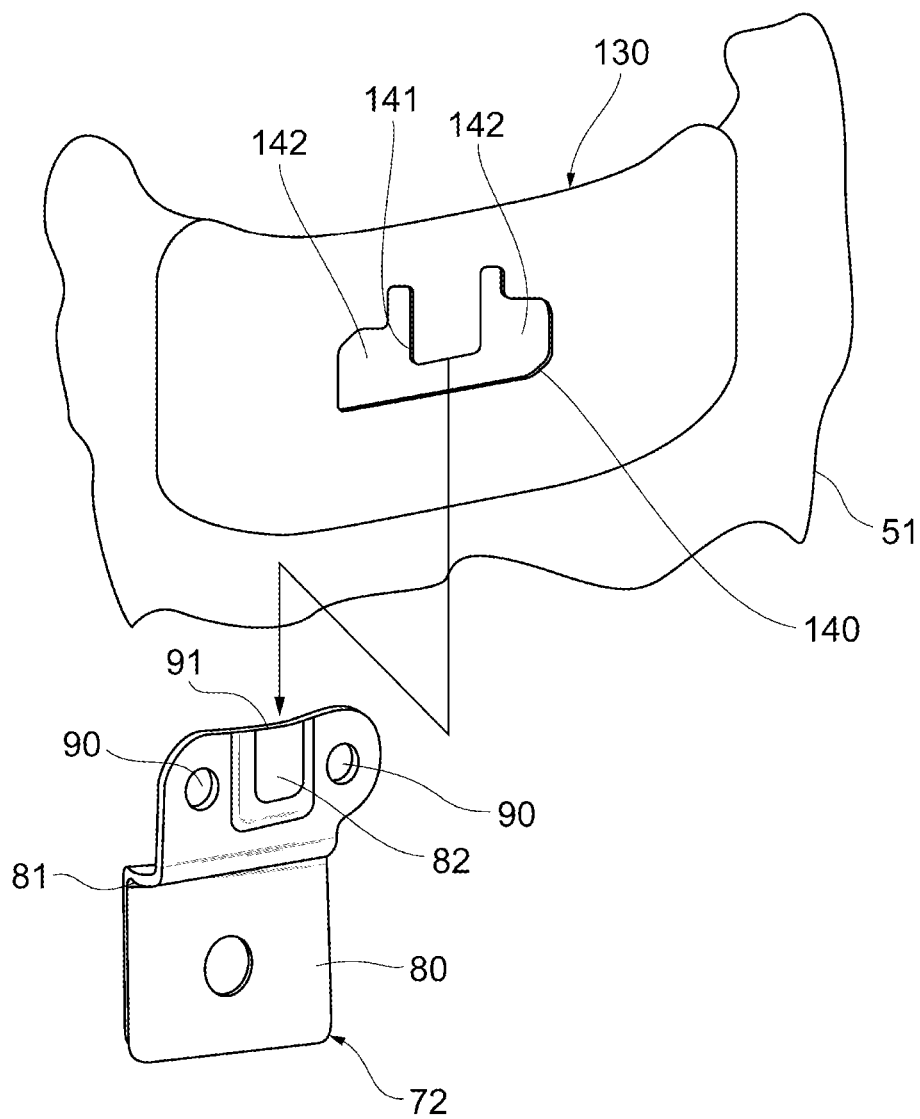
FIG. 5 is an illustration showing a configuration of a bracket and a cover holding plate.

As shown in FIGS. 3-5, the bracket 72 may include, for example, a first fixing plate 80 that is fixed onto the front plate 76, a connecting plate 81 extending forward from an upper end of the first fixing plate 80, and a second fixing plate 82 extending upward from a distal end of the connecting plate 81.

The second fixing plate 82 is provided with two first holes 90 that are arranged side by side in the right and left direction, as shown in FIG. 5. The first hole 90 may, for example, serve as a screw hole. A receiving part 91, onto which a cover holding plate 130 (to be described later) hooks, is formed between the first holes 90. The receiving part 91 is constituted by part of the second fixing plate 82 being recessed frontward.

The opening member 30 may have, for example, a front surface part 100 and an upper surface part 101 as shown in FIGS. 3 and 4. The front surface part 100 is formed in a plate-like shape extending in an up and down direction and provided with an opening 31 at a central part thereof. As shown in FIG. 3, the opening 31 corresponds to the shape of the opening 70a of the opening frame 70 and has a shape slightly larger than the opening 70a. Two second holes 110 are formed below the opening 31 of the front surface 100, the second holes 110 corresponding to the first holes 90 of the bracket 72. The upper surface part 101 is formed in a plate-like shape covering the upper surface of the backrest frame 40.

A cover member 120 that covers an upper side and a rear side of a passage of the seat belt 13 inside the backrest 11 is provided on the rear side of the opening member 30. The opening member 30 and the cover member 120 may be made of, for example, a resin.

A cover holding plate 130 (a cover holding member) is provided between the front surface part 100 of the opening member 30 and the bracket 72 of the backrest frame 40. The cover holding plate 130 holds the cover 51 that covers the cushion part 50 of the backrest 11. As shown in FIGS. 4 and 5, the cover holding plate 130 is a substantially rectangular shape which is elongated in the right and left direction. The cover holding plate 130 may be made of, for example, a resin and has a higher stiffness than the cover 51. An end of the cover 51 is sewed with the cover holding plate 130. The cover holding plate 130 only has to hold at least a part of the cover 51 which is located around the opening member 30, i.e., it does not have to hold the entire cover of the backrest 11, but only part of the cover of the backrest 11.

Figure 6:
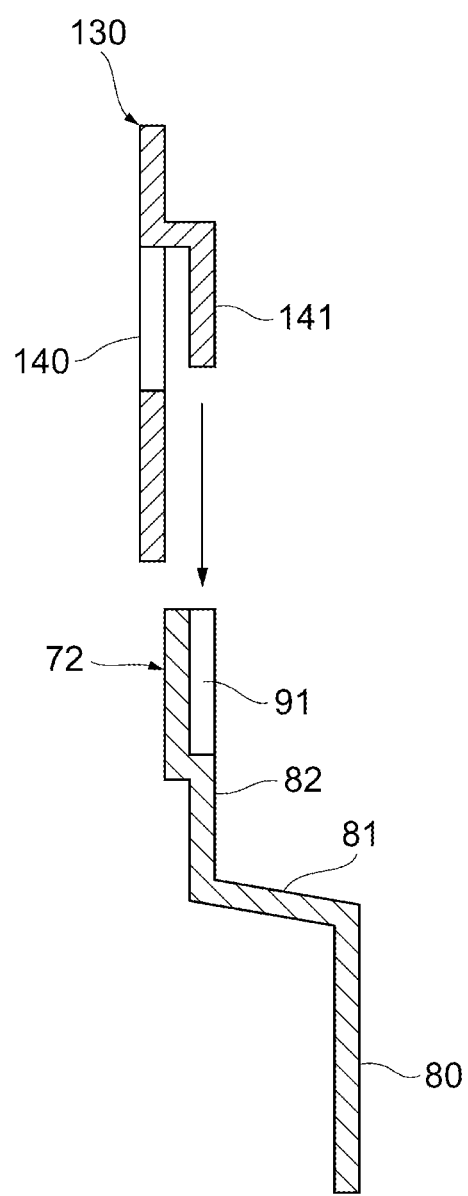
FIG. 6 is a cross-sectional view showing a configuration of the bracket and the cover holding plate.

The cover holding plate 130 has an opening 140 at a central part thereof, as shown in FIG. 5. The opening 140 has a hook part 141 at a central part thereof, which is to hook the receiving part 91 on the bracket 72. As shown in FIG. 6, the hook part 141 is formed so as to be retracted toward the bracket 72 side (rear side) and projected downward. By hooking the hook part 141 onto the receiving part 91 from the above and thereby fitting them together, the cover holding plate 130 can be attached to the bracket 72. Further, the fitting of the hook 141 into the receiving part 91 allows the cover holding plate 130 to be positioned in the up and down direction and in the right and left direction.

As shown in FIG. 5, spaces on the right and left sides of the hook part 141 in the opening member 140 serve as two third holes 142. As shown in FIG. 3, the third holes 142 are arranged so as to coincide with the first holes 90 and the second holes 110 when the cover holding plate 130 is attached to the bracket 72. Accordingly, the second holes 110 of the opening member 30, the third holes 142 of the cover holding plate 130 and the first holes 90 of the backrest frame 40 are arranged, in the order mentioned, toward the rear side so as to coincide with each other.

The opening member 30 and the cover holding plate 130 are fixed to the bracket 72 by inserting screws 150 (fastening members) into the second holes 110, the third holes 142 and the first holes 90 and fastening the screws.

Figure 7:
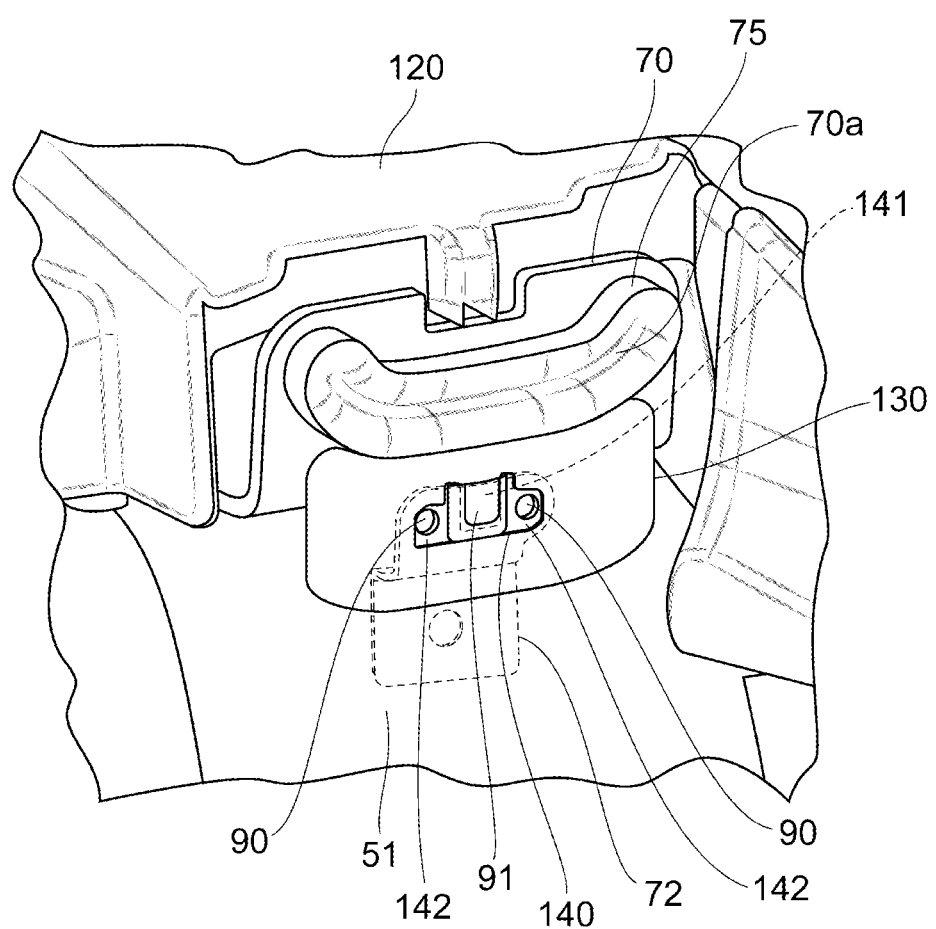
FIG. 7 is an illustration showing a state in which the cover holding plate (cover not shown) is attached to the bracket.
Figure 8:
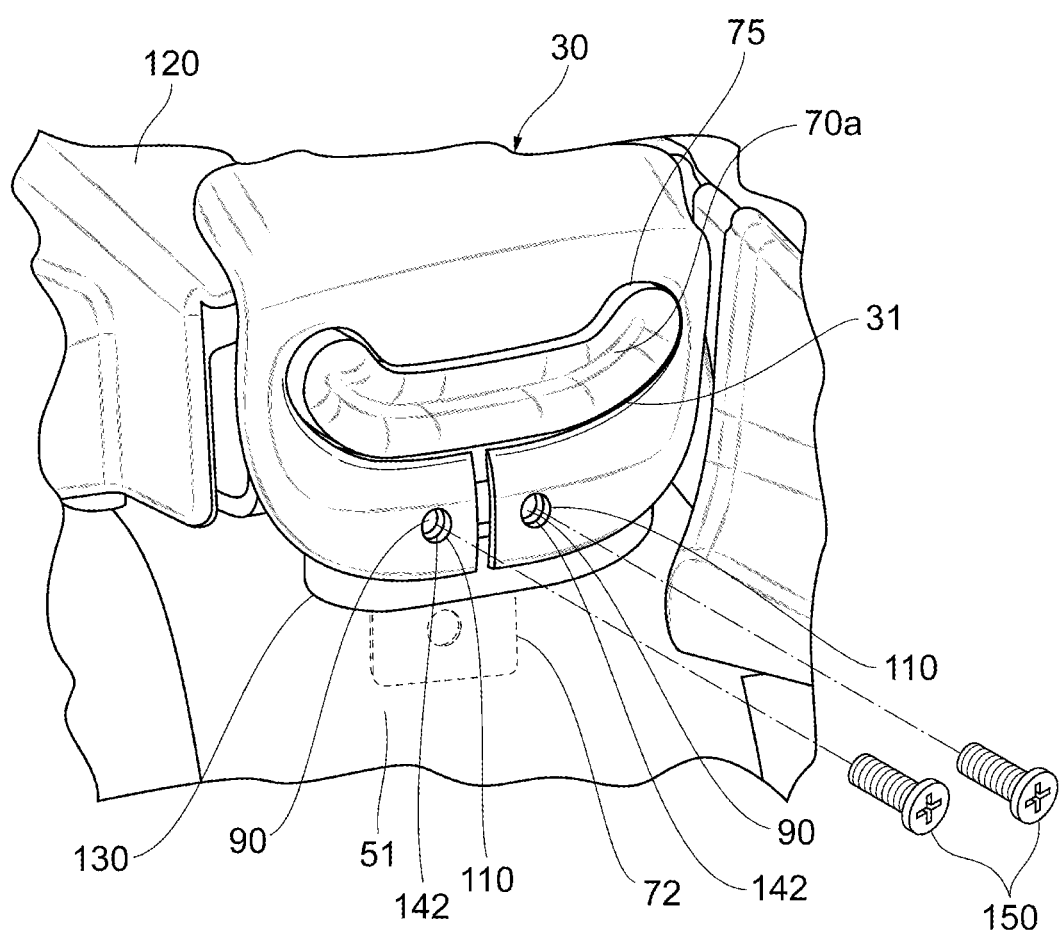
FIG. 8 is an illustration showing an opening member attached onto the cover holding plate (cover not shown).

Next, an assembly operation of the backrest 11 of the vehicle seat 1 will be described below. The bracket 72 has been fixed to the backrest frame 40 in advance. The cover 51 of the backrest 11 has been sewed with the cover holding plate 130. First, the cushion part 50 is attached to the backrest frame 40 and the cover 51 is provided so as to cover them. Next, as shown in FIG. 5, the hook part 141 of the cover holding plate 130 is fitted into the receiving part 91 from the above to thereby attach the cover holding plate 130 to the bracket 72 as shown in FIG. 7. In this process, the positions of the second holes 110 and the positions of the third holes 142 coincide with each other. As a result, part of the cover 51 which is located around the opening member 30 is fixed, under a sufficient tension, to the backrest frame 40 as shown in FIG. 3, and the opening member 30 is then provided thereabove as shown in FIG. 8. In this process, the positions of the first holes 90 coincide with the positions of the second holes 110 and the third holes 142. The screws 150 are inserted into the second holes 110, the third holes 142 and the first holes 90 and fastened. As a result, the opening member 30 and the cover holding plate 130 are fixed to the bracket 72.

According to the present embodiment, since the cover holding plate 130 holds the cover 51 and such cover holding plate 130 is provided between the opening member 130 and the backrest frame 40 and fixed to the backrest frame 40, a sufficient tension is applied to part of the cover 51 which is located around the opening member 30. As a result, even when the part of the cover 51 which is around the opening member 30 is pressed by, for example, the user, it is still possible to suppress a gap to be created between the opening member 30 and the cover 51. In addition, since the opening member 30 and the cover holding plate 130 are fixed to the backrest frame 40 by the screws 150 inserted into the second holes 110 of the opening member 30, the third holes 142 of the cover holding plate 130 and the first holes 90 of the backrest frame 40, it is possible to achieve a simple structure of the vehicle seat 1 and improve the workability during the assembly of the vehicle seat 1. In addition, it is possible to suppress the crinkling and deformation of the cover 51.

Since the backrest frame 40 has the bracket 72 provided with the first holes 90 and the cover holding plate 130 may be detachably attached to the bracket 72, it is possible to easily attach the cover holding plate 130 to the bracket 72 while applying an appropriate and sufficient tension to the cover 51 during the assembly.

Since the cover holding plate 130 can be detachably attached to the bracket 72 by hooking the bracket 72 from the above, it is possible to even more easily attach the cover holding plate 130 to the bracket 72. Further, even if, for example, a sitter sits on the vehicle seat 1 and downward external force acts on the cover 51, the cover 51 can still be securely held by the cover holding plate 130.

The cover holding plate 130 can be detachably attached to the bracket 72 so as to be positioned in the right and left direction relative to the bracket 72 and, when the cover holding plate 130 is attached to the bracket 72, the positions of the third holes 142 of the cover holding plate 130 coincide with the positions of the first holes 90 of the backrest frame 40. With such configuration, it is possible to easily perform positioning of the first holes 90 and the third holes 142. Accordingly, the workability during the assembly of the vehicle seat 1 can be improved.

Since the end of the cover 51 is sewed with the cover holding plate 130, the cover 51 is securely held by the cover holding plate 130.

Since the cover holding plate 130 has a higher stiffness than the cover 51, even when the cover holding plate 130 pulls the cover 51, the cover holding plate 130 is still less likely to be distorted. With such configuration, the cover holding plate 130 can be appropriately fixed to the bracket 72 while pulling the cover 51.

Since the second holes 110 of the opening member 30, the third holes 142 of the cover holding plate 130 and the first holes 90 of the backrest frame 40 are provided below the opening 31, the opening member 30, the cover holding plate 130 and the backrest frame 40 can be securely fixed near the opening 31. Further, since the holes 110, 142 and 90 are hidden by the seat belt 13, the design of the vehicle seat 1 can be improved.

Since the opening member 30 is embedded in the backrest 11 below the upper surface of the backrest 11, the opening member 30 does not protrude from the upper surface of the backrest 11, and it is therefore possible to reduce the risk of injuring the sitter when, for example, the backrest 11 is raised upward using the reclining function.

Since the opening member 30 is provided at a position on the rear side with respect to the front surface of the backrest 11, it is possible to reduce the risk of injuring the sitter when, for example, the backrest 11 is raised upward using the reclining function.

Although the preferred embodiment of the present invention has been described above with reference to the attached drawings, the present invention is not limited to such example. It is obvious that a person skilled in the art can conceive of various types of changes and modifications within the range of ideas to be set forth in the scope of the claims and it should be understood that such changes and modifications belong to the technical scope of the present invention as a matter of course.

For example, the structure of the backrest frame 40, the structure of the opening member 30 and the structure of the cover holding plate 130 are not limited to those described in the above embodiment. For example, the backrest frame 40 may not include the bracket 72 and, in such configuration, the cover holding plate 130 may be directly fixed to the main body of the backrest frame 40. The structure of the bracket 72 is also not limited to the structure described in the above embodiment. The cover holding plate may not have a plate-like shape. The cover 51 may not be sewed with the cover holding member and may instead be fixed to the cover holding member using an adhesive or the like. The opening member 30 may not be embedded in the backrest 11 below the upper surface of the backrest 11 and the present invention is applicable to the configuration in which the opening member 30 is projected from the upper surface of the backrest 11. Further, the configurations of the seat part 10, the backrest 11 and the seat belt 13, as well as the entire configuration of the vehicle seat 1, may not be limited to those described in the above embodiment.

The present invention is useful for providing a vehicle seat which suppresses a gap to be created between a cover and an opening member having an opening that allows a seat belt to pass therethrough, and has a simple structure which achieves good workability during assembly.

What is claimed is:

1. A vehicle seat having a seat part, a backrest and a seat belt, the vehicle seat comprising:
   a backrest frame provided in the backrest;
   an opening member provided on an upper part of the backrest, the opening member having an opening that allows the seat belt extending from an inside of the backrest to pass through toward a front side; and
   a cover holding member that holds a cover covering a surface of the backrest, the cover holding member being connected to the cover,
   wherein the opening member, the cover holding member and the backrest frame have respective holes,
   wherein the hole of the opening member, the hole of the cover holding member and the hole of the backrest frame are arranged in the order mentioned toward a rear side of the backrest from a front side of the backrest, so as to coincide with each other, and the opening member and the cover holding member are fixed to the backrest frame by a fastening member inserted in the front-rear direction of the backrest in the holes, and
   wherein
   the backrest frame has a bracket provided with the hole of the backrest frame,
   the bracket includes a first fixing plate, a connecting plate extending forward from an upper end of the first fixing plate, and a second fixing plate extending upward from a distal end of the connecting plate,
   the cover holding member is formed in a plate-like shape, and has a hook part at a center part thereof,
   the bracket has a receiving part for hooking the hook part from above to thereby fit them together,
   the receiving part is formed so as to be recessed frontward, and the hook part is formed so as to be retracted toward a rear side and projected downward,
   the cover holding member is made of a resin, and
   an end of the cover is sewed with the cover holding member.

2. The vehicle seat according to claim 1, wherein the cover holding member is detachably attached to the bracket such that the cover holding member is positioned in a right and left direction relative to the bracket and, when the cover holding member is attached to the bracket, a position of the hole of the cover holding member and a position of the hole of the backrest frame coincide with each other.

3. The vehicle seat according to claim 1, wherein the cover holding member has a higher stiffness than the cover.

4. The vehicle seat according to claim 1, wherein the hole of the opening member, the hole of the cover holding member and the hole of the backrest frame are provided below the opening.

5. The vehicle seat according to claim 1, wherein the cover is made of a stretchable and elastic material such as chemical fiber, artificial leather or genuine leather.

* * * * *